US008812146B2

(12) United States Patent
Einarsson et al.

(10) Patent No.: US 8,812,146 B2
(45) Date of Patent: Aug. 19, 2014

(54) BATCH CREATION

(75) Inventors: Hordur Einarsson, Seltjarnarnes (IS); Arni Einarsson, Reykjavik (IS); Hrafnkell Eiriksson, Kopavogur (IS)

(73) Assignee: Marel Food System HF. (IS)

( * ) Notice: Subject to any disclaimer, the term of this patent is extended or adjusted under 35 U.S.C. 154(b) by 676 days.

(21) Appl. No.: 12/525,107

(22) PCT Filed: Jan. 31, 2008

(86) PCT No.: PCT/IS2008/000002
§ 371 (c)(1),
(2), (4) Date: Jan. 11, 2010

(87) PCT Pub. No.: WO2008/093364
PCT Pub. Date: Aug. 7, 2008

(65) Prior Publication Data

US 2010/0292828 A1 Nov. 18, 2010

(30) Foreign Application Priority Data

Jan. 31, 2007 (IS) .............................................. 8600

(51) Int. Cl.
*G06F 19/00* (2011.01)

(52) U.S. Cl.
USPC ................. 700/114; 700/115; 700/99; 83/13; 99/537; 53/435; 53/502; 209/592

(58) Field of Classification Search
USPC ................... 700/114, 115, 99; 83/13; 99/537; 53/435, 502; 209/592
See application file for complete search history.

(56) References Cited

U.S. PATENT DOCUMENTS

| | | | | |
|---|---|---|---|---|
| 5,496,210 | A * | 3/1996 | Davis | 452/169 |
| 6,533,125 | B1 * | 3/2003 | Jensen | 209/592 |
| 6,799,684 | B2 | 10/2004 | Wooldridge | |
| 2005/0137744 | A1 | 6/2005 | Winkelmolen et al. | |

FOREIGN PATENT DOCUMENTS

| | | | |
|---|---|---|---|
| DE | 10334643 | A1 | 3/2005 |
| DE | 102005047796 | | 4/2007 |
| EP | 0726098 | B1 | 1/2002 |
| WO | 2005019071 | | 3/2005 |

OTHER PUBLICATIONS

International Search Report PCT/IS2008/000002; Dated Jun. 9, 2008.
"User's Guide, Portio 4003", Marel hf., Feb. 2004, pp. 1-283. (in English and German).
"Weber price list CCS 902", Weber, 1 page.

* cited by examiner

*Primary Examiner* — Tejal Gami
(74) *Attorney, Agent, or Firm* — Cantor Colburn LLP

(57) ABSTRACT

Apparatus, method, and system for combining a plurality of items into a batch having a set number of items. Number of items are put together onto a production line to form a batch along with non-batch items which are not suitable for inclusion within the batch onto the production line. The batch is advanced on the production line as a partial batch without the non-batch item being added to it when a batch is not complete. A reminder batch is created after the non-batch items have been added to the production line and the remainder batch includes the number of items that must be added to the partial batch to make a full batch.

25 Claims, 14 Drawing Sheets

BATCH CREATION

FIELD OF THE INVENTION

The present application relates to the creation of batches of items, such as pieces of foodstuffs. The invention allows the items which make up the batch to be packaged together.

BACKGROUND

In the food industry, pieces of food are often packaged together in a single pack. U.S. Pat. No. 6,799,684 discloses a counting and portioning system which counts discrete articles that conform to predetermined specifications into lots having a predetermined number of articles or a target volume. The system includes at least one portioning bin positioned to receive articles from a conveyor. The at least one bin has at least first and second outlet gates for emptying articles into separate respective first and second locations. A scanner detects and maintains a count of articles that are received in the at least one portioning bin and fall within the predetermined specification. The detector unit generates an out-of-specification signal when an article or group of articles received in the at least one portioning bin falls outside the predetermined specification. A control unit causes the first outlet gate to open when the count or volume of articles is equal to the predetermined number and causes the second outlet gate to open in response to receipt of an out-of-specification signal. The profile/volume signature for every part scanned and delivered from the infeed to the scanner is stored.

However, some situations in the food industry are such that U.S. Pat. No. 6,799,684 is inadequate. For example, when pork chops are packaged, the individual pork chops which make up the batch within a pack are often placed by hand on a plastic or polystyrene tray which is then wrapped. This is done manually because pork chops are quite difficult to handle in an automated system, and whilst some processes have been automated, it has previously been found necessary for the individual chops to be processed extensively by hand so as to identify chops which are misshapen or which should be rejected for some other reason. On a production line, it is possible for off-cuts of meat to be present which should not be included in the tray. For example pieces of meat which are at the end of a primal cut of pork loin which is cut up might need to be removed from the production line without being packed. A primal cut is a larger section of an animal carcass which is cut up to form cuts which are sold in shops. For example, a pork loin is cut up to form a number of cuts which are sold in shops including chops, cutlets and loin. Additionally, the meat packaging industry has had difficulty in putting individual pieces of meat together to form a batch on a tray in such a way that the pieces of meat are placed in the tray accurately and with some regard to the presentation of the pieces of meat within the pack. FIGS. 1 and 2 show a pack of meat in which four chops 1 are positioned within a tray 2. The chops 1 are positioned within the tray so as to overlap each other which not only reduces the size of the tray required to form the pack, but is also pleasing to the eye of the buyer of the pack 3. The buyer is able to see each of the chops 1 which is in the pack 3. This is reassuring because the end buyer is able to judge the freshness of the visible chops 1. The tray would normally be closed by a plastic film later in the production process, although the film is not shown in FIGS. 1 and 2.

As mentioned above, the chops 1 are often placed in the tray 2 by hand in order to ensure their correct arrangement within the tray, and to remove any off-cuts or other pieces of meat which are not appropriate to include in the pack 3.

Some automated machinery has been proposed. For example, it has been proposed to use a retractable conveyor in order to load items on to a tray. An example of such a machine would be the QuickLoader made by Marel hf. The QuickLoader is a servo-controlled retractable conveyor which loads items into trays or onto another conveyor, and is able to position the item in the tray or on the other conveyor accurately. The retractable conveyor includes a region of conveyor which, on retraction, is quickly removed from beneath the item which it is transporting. This allows the item to drop, and because the item is positioned substantially above the position it is intended to put the item, it drops into the correct position. However, it is only known to use such a machine so as to drop items into a tray one at a time, and by dropping them into the tray from slightly different positions, the overlapping arrangement shown in FIGS. 1 and 2 can be achieved. There are various ways of removing off-cuts. If an off-cut item travels along the conveyor, a mechanical arm could extend across the belt to remove it from the conveyor, or a robot arm using machine vision could identify and pick up off-cut items, or the off-cut is simply run off the end of the retractable conveyor to a suitable area for disposal. If, for example, the conveyor is programmed to place four pieces of meat in the tray, these are added one at a time, and each piece of meat is dropped into the tray from a slightly different position in order to achieve the overlap. However, because each piece of meat is added individually, it is felt that the machine can be made quicker by supplying a number of items to the conveyor which have already been formed into the batch which is to be dropped into the tray. Unfortunately, this leads to a number of difficulties which the inventors of the present application have sought to solve. It is not always possible to supply all of the items required to fill a batch in one go, and so the batch of items supplied does not always form a complete batch. This might be because of the presence of an off-cut, or for example a quality control system which rejects an item based on some predefined criteria. In this case, the incomplete batch may have to be rejected in order to free the production line for the next complete batch. Clearly, this is wasteful. The present invention aims to reduce the wastage and improve operation.

DESCRIPTION OF THE INVENTION

According to a first aspect of the present invention, apparatus arranged to combine a plurality of items into a batch having a set number of items, comprises a production line; a source of items which is arranged to place the set number of items together on the production line to form batches, characterised in that the source additionally supplies items to the production line which are not suitable to be included in the batch such that, if a batch is incomplete when an unsuitable item is supplied, that batch is advanced on the production line as a partial batch without the non-batch item being added to it, in that the source is arranged to create a remainder batch after the non-batch items have been added to the production line in which the remainder batch includes the number of items that must be added to the partial batch to make a full batch, and in that the apparatus includes a combiner arranged to add the remainder batch to the partial batch to make up a full batch.

Joining a partial batch and a remainder batch to form a full batch is an important advantage in this invention as a result of the presence of non-batch items on the production line. In the preferred embodiment, this is a result of off-cuts being placed on the production line which are not to be included as part of the batches.

Also in the preferred embodiment, the source of items includes a source controller which is arranged to control the advance of the production line. It is preferred that the source controller is arranged to control the source of items to create remainder batches, when required, containing the number of items that must be added to a partial batch to make a full batch. Thus, the source controller is important in the preferred embodiment to control the apparatus to allow the combining of the partial and remainder batches.

Preferably, the source controller is arranged to generate a partial batch signal for directing to the combiner which indicates at least one of a) the number of items making up a partial batch, and b) the number of items making up a remainder batch. This allows the combiner to operate in such a way that a full batch can be made up from a partial batch and a remainder batch.

It is preferred that the source controller is arranged to allocate an electronic label to each item, the label being held within the source controller, the label for non-batch items being distinguishable from other labels. In this way, the non-batch items can be distinguished from batch items.

It is preferred that the source of items is a source of foodstuff items, and in particular a portioning machine which includes a knife arranged to cut a bulk piece of foodstuff into portions which constitute the items. Most preferably, the portioning machine includes a mould arranged to retain the bulk piece of foodstuff as it is portioned, and this may be arranged to cut a primal cut of meat into portions.

In the preferred embodiment, the combiner includes a retractable conveyor which is a very effective piece of apparatus ideally suited for combining partial and remainder batches. The combiner preferably includes a conveyor controller arranged to control the conveyor to add the remainder batch to the partial batch to form a full batch. The conveyor controller is preferably connected to the source controller to receive the partial batch signal, thereby achieving an interaction between the two controllers.

It is preferred that the conveyor controller is further arranged to control the conveyor to add the remainder batch to the partial batch so that the two batches are aligned as if they were formed as a single batch.

To remove non-batch items, the conveyor controller may be arranged to control the conveyor so as to run those items off its end away from the partial batch, or an arm is included for movement across the path of the items, operation of which serves to remove non-batch items from the apparatus.

The combiner preferably includes a sensor arranged to detect the position of an item on the conveyor. This allows for accurate positioning of the item when combining batches, or placing batches in a tray or otherwise positioning a batch, and also facilitates the removal of non-batch items from the conveyor.

According to a second aspect of the invention, a method of combining a plurality of items into a batch having a set number of items, comprises placing the set number of items together onto a production line to form a batch; characterised by supplying non-batch items which are not suitable for inclusion within the batch onto the production line, advancing the batch on the production line as a partial batch without the non-batch item being added to it when a batch is not complete, creating a remainder batch after the non-batch items have been added to the production line, in which the remainder batch includes the number of items that must be added to the partial batch to make a full batch, and adding the remainder batch to the partial batch to make up a full batch.

It is preferred that the method includes the step of counting the number of items in a batch, and if the batch is partial, calculating the number of items to be included in the remainder batch which, when added to the partial batch will make a full batch. This facilitates the identification of partial batches, and the creation of remainder batches.

It is also preferred that the method further includes generating a partial batch signal indicating at least one of a) the number of items making up a partial batch, and b) the number of items making up a remainder batch. The partial batch signal can be used to control the generation of a remainder batch and/or to allow the combining of the partial and remainder batch.

It is preferred that the method also includes the allocating within an electronic system of an electronic label to each item, the label for non-batch items being distinguishable from other labels.

DETAILED DESCRIPTION

In one of the preferred embodiments which will be described in detail in the following text. It is preferred that the items are foodstuff items, and more preferably that the step of placing the set number of items together onto a production line to form a batch includes cutting a bulk piece of foodstuff into portions which constitute the items. Most preferably, the bulk piece of foodstuff is a primal cut of meat. However, the invention is equally applicable to other applications/configurations as will become apparent from the discussion of other embodiments following this detailed discussion of a configuration in combination with a particular portioning machine.

The step of adding the remainder batch to the partial batch is preferably done by use of a retractable conveyor, which is highly effective at positioning items together. It is also preferred that the partial batch signal is received, and that this facilitates the adding of the remainder batch to the partial batch so as to be aligned as if they were formed as a single batch.

In order to remove non-batch items, the conveyor can be controlled so as to run non-batch items off its end away from the partial batch, or an arm can be arranged to sweep an item off the conveyor.

It is preferred that the set number of items making up a full batch is at least three so that at least one of the partial batch and the remainder batch includes more than one item.

According to a third aspect of the invention, a system for combining a plurality of items into a batch having a set number of items comprises: a source of items arranged to identify when a non-batch item which is not suitable to be included in a batch is placed on a production line; a counter arranged to count the number of items in a partial batch that is created when a batch is incomplete; a source controller arranged to control a source of the items to subsequently create a remainder batch having the number of items required which, when added to the partial batch, will make the partial batch up to a full batch, wherein the source controller further generates a partial batch signal which is used to control a combiner to add the remainder batch to the partial batch.

An embodiment of the present invention will now be described by way of example only and with reference to the drawings in which.

Figure 1:
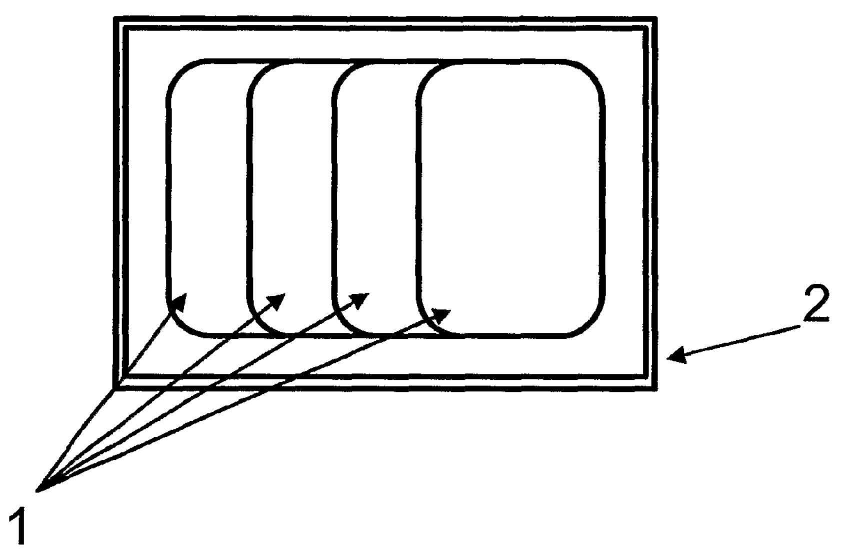
FIG. 1 is a top hand view of a tray containing four pieces of meat.
Figure 2:
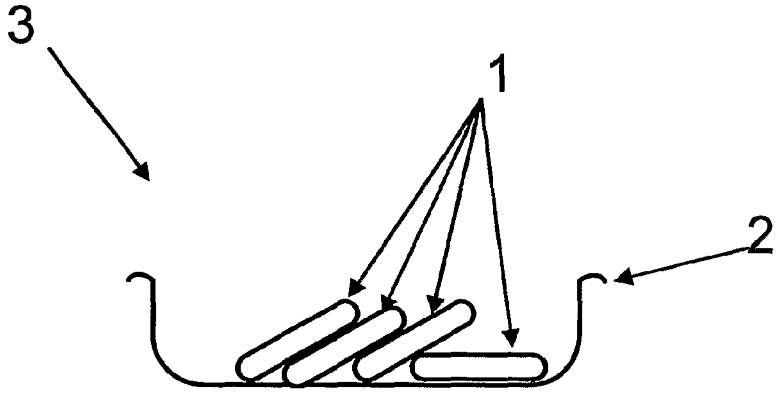
FIG. 2 is a schematic side view of the tray of FIG. 1.
Figure 21:
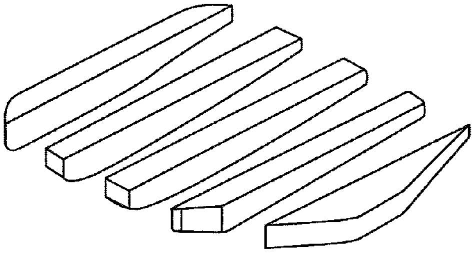

FIG. 21 shows chicken fingers after the chicken breast has been processed by the machine In this embodiment, it should be understood that it is an aim to produce a pack 3 of slices of meat, in this case of chops 1 in a tray 2 typically made from plastic or polystyrene. It is intended that the chops are placed in the tray 2 automatically so as to require minimal manual intervention. In the present invention, the tray 2 shown in FIGS. 1 and 2 contains four chops which, in this case, is the full number of chops to be included in the tray, and therefore forms a batch. The number of chops in each batch will depend on the requirement of the customer. The batch could be less than four in number, or could be greater than four, but for convenience, in this embodiment, it is four. Additionally, it will be appreciated that the batch may be made up of chops, steaks, sliced meats, or other foodstuffs which might be packaged in this way, for example, the batch could be made up of fresh or of frozen fish, fresh or frozen chicken, or even pastry items. If the items which make up the batch are meats, any one of a variety of meats can be used. The meat could be pork, beet lamb or poultry or a combination thereof but the invention is not limited to any particular type of meat or to any particular foodstuff.

In this embodiment, a portioning machine 4 is used to slice a primal cut of meat into chops and to place the chops onto a conveyor within the portioning machine 4. The portioning machine 4 will be described in more detail below in connection with FIGS. 8 to 12. The portioning machine 4 passes the chops onto a retractable conveyor 5 which is described in more detail in relation to FIGS. 13 to 15 below. The retractable conveyor places the chops into a tray 2.

Figure 3:
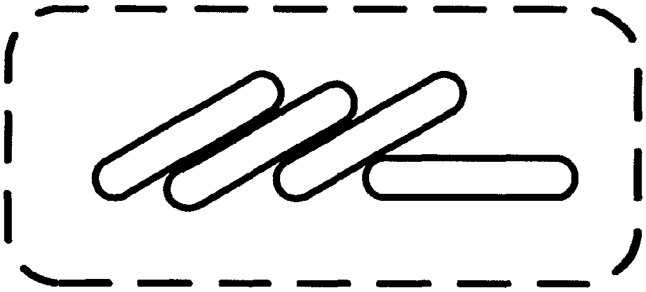
FIG. 3 is a side view showing a full batch of four items.
Figure 4:
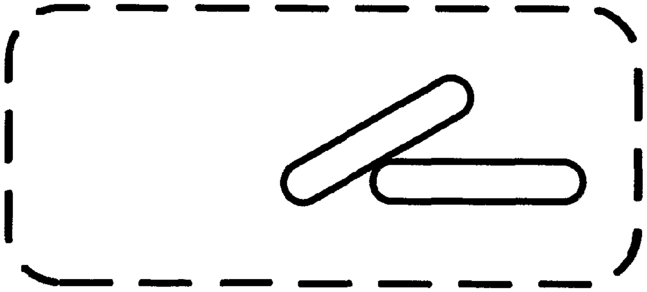
FIG. 4 shows a partial batch of only two items.
Figure 5:
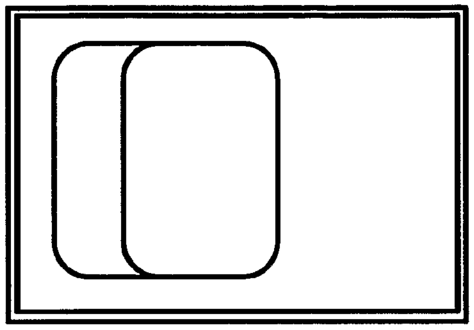
FIG. 5 is a top hand view of a tray containing a partial batch of items.
Figure 6:
FIG. 6 is a schematic side view of the tray and items of FIG. 5.
Figure 7:
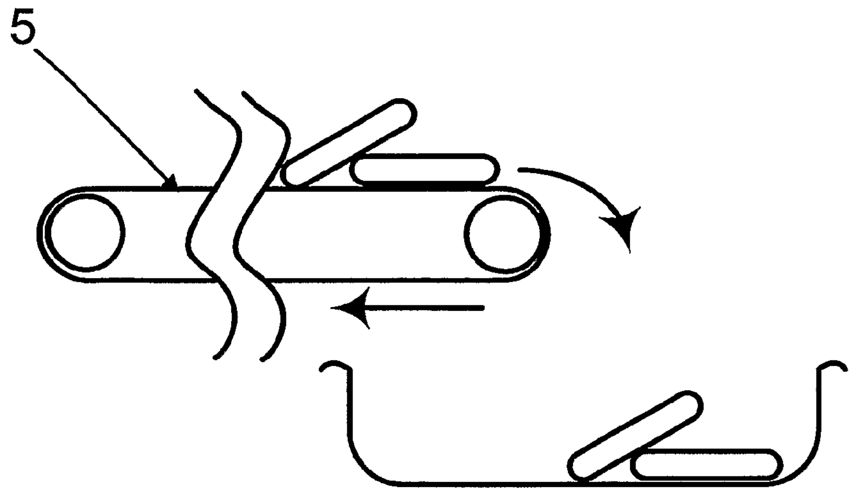
FIG. 7 is a schematic view showing a remainder batch of two items positioned on a retractable conveyor and ready to be dropped into position on a partial batch below.

In FIG. 3, a full batch is shown with a full batch of four chops to fill a tray. However, on occasions, it might not be possible to produce a full batch. In the present embodiment, the chops are obtained from the portioning machine 4 in which a primal cut of meat, such as a loin of pork is inserted. The portioning machine 4 slices the meat into pork chops and places them on a conveyor within the portioning machine 4. When the first or last chop is cut from the primal cut of meat, it might not be suitable for inclusion in a pack 3 because it might not be the correct size, weight or shape. However, because the ends of the primal cut of meat are present in the portioning machine and are within the production line, it is necessary to advance the chops which are within the portioning machine and which have already been sliced before a complete batch is created in order to allow the ends of the primal cut of meat to be placed on the portioning machine's conveyor so as to move it or them out of the way of the next acceptable chop which is sliced from a next primal cut of meat. Thus, on occasions, the portioning machine is liable to generate a partial batch, that is, a batch of meat, such as is shown in FIG. 4, in which there are insufficient numbers of pork chops to make the full batch. The partial batch is passed through the production line and placed in the tray 2 as shown in FIGS. 5 and 6 where there is still space in the tray for two more chops in order to create a full batch. Below, it will be described how this partial batch is made up to a full batch without it being necessary for manual intervention or to discard the partial batch. In simple terms, FIG. 7 shows a retractable conveyor 5 on which an additional two chops are located which are about to be added to the partial batch already sitting in the tray 2 below. Thus, the retractable conveyor 5 supplies the remaining number of chops to make up the batch, which is referred to herein as the 'remainder batch'.

Figure 8:
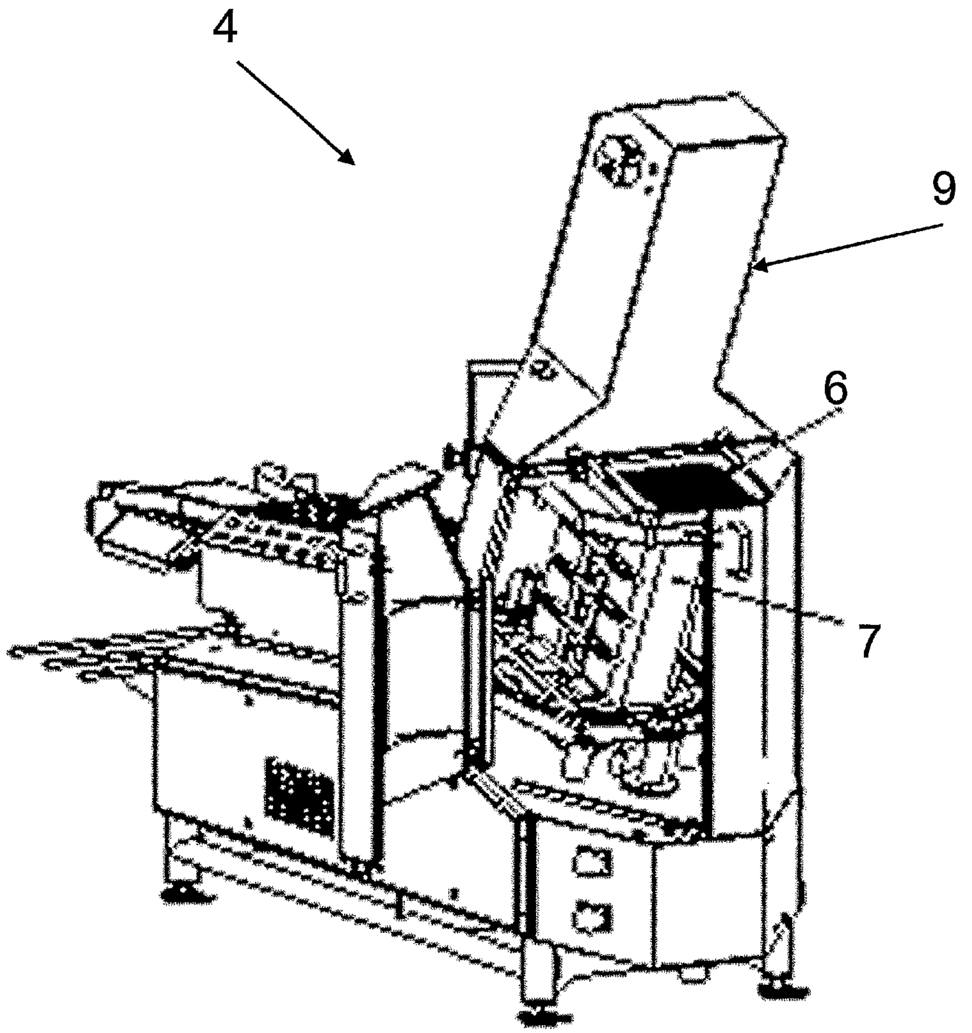
FIG. 8 is a perspective view of a portioning machine.
Figure 9:
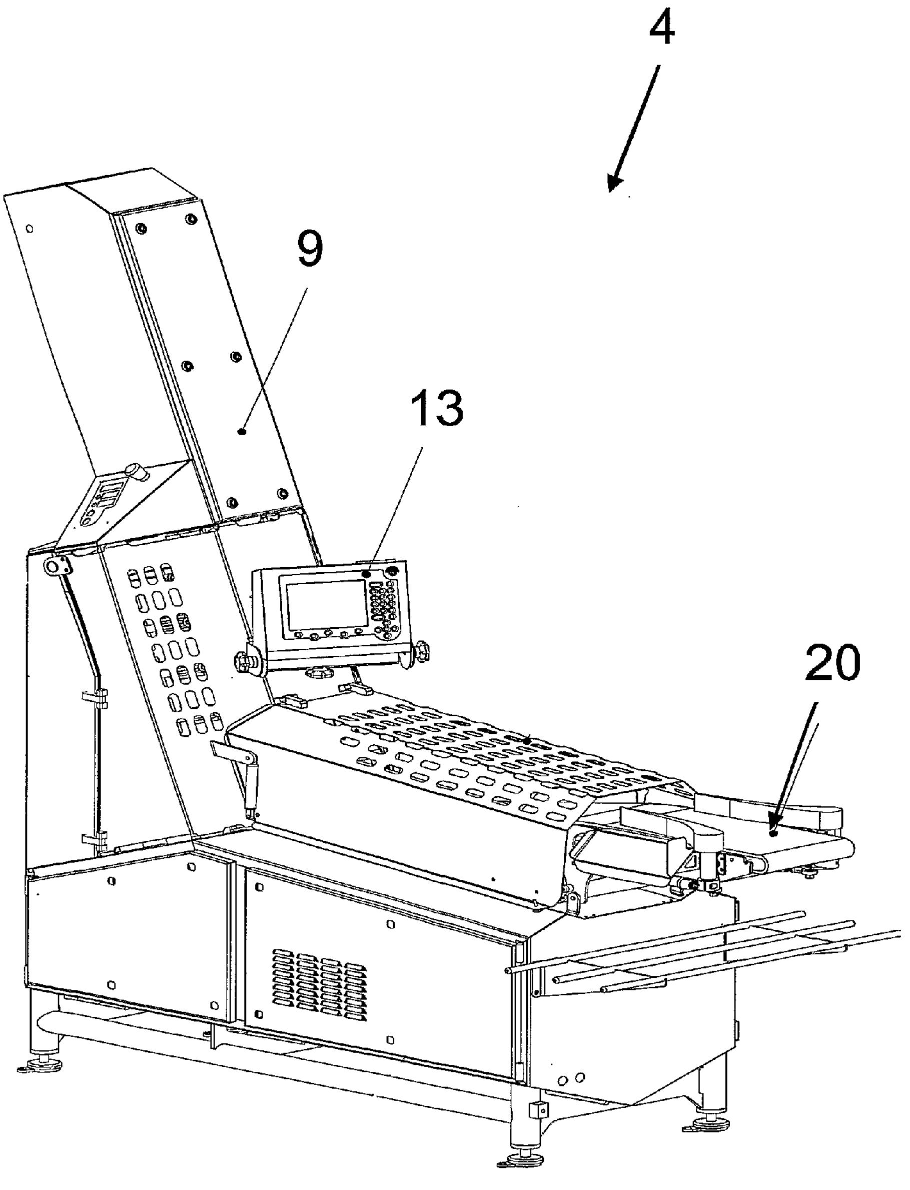
FIG. 9 is another perspective view of the portioning machine shown in FIG. 8.

A portioning machine 4 is shown in FIGS. 8 and 9. In FIG. 8, the machine 4 includes a lid 6 which covers an entry port for insertion of a primal cut of meat into the machine. The meat is inserted into a channel in a mould 7 which supports the meat above a knife region 8 which operates to slice the meat held within the mould 7. A piston (not shown) is housed within a piston housing 9 which operates to push the meat through the mould 7 towards the knife region 8. As the meat is sliced into chops, it drops onto a portioning conveyor 10 which is controlled to advance by a short distance between each slicing operation. In this way, each piece of meat is positioned overlapping the previous piece of meat. Once a full batch has been made up, the portioning conveyor 10 advances by a greater distance so that the next piece of meat will fall on the portioning conveyor 10 spaced away from the previous complete batch.

Figure 10:
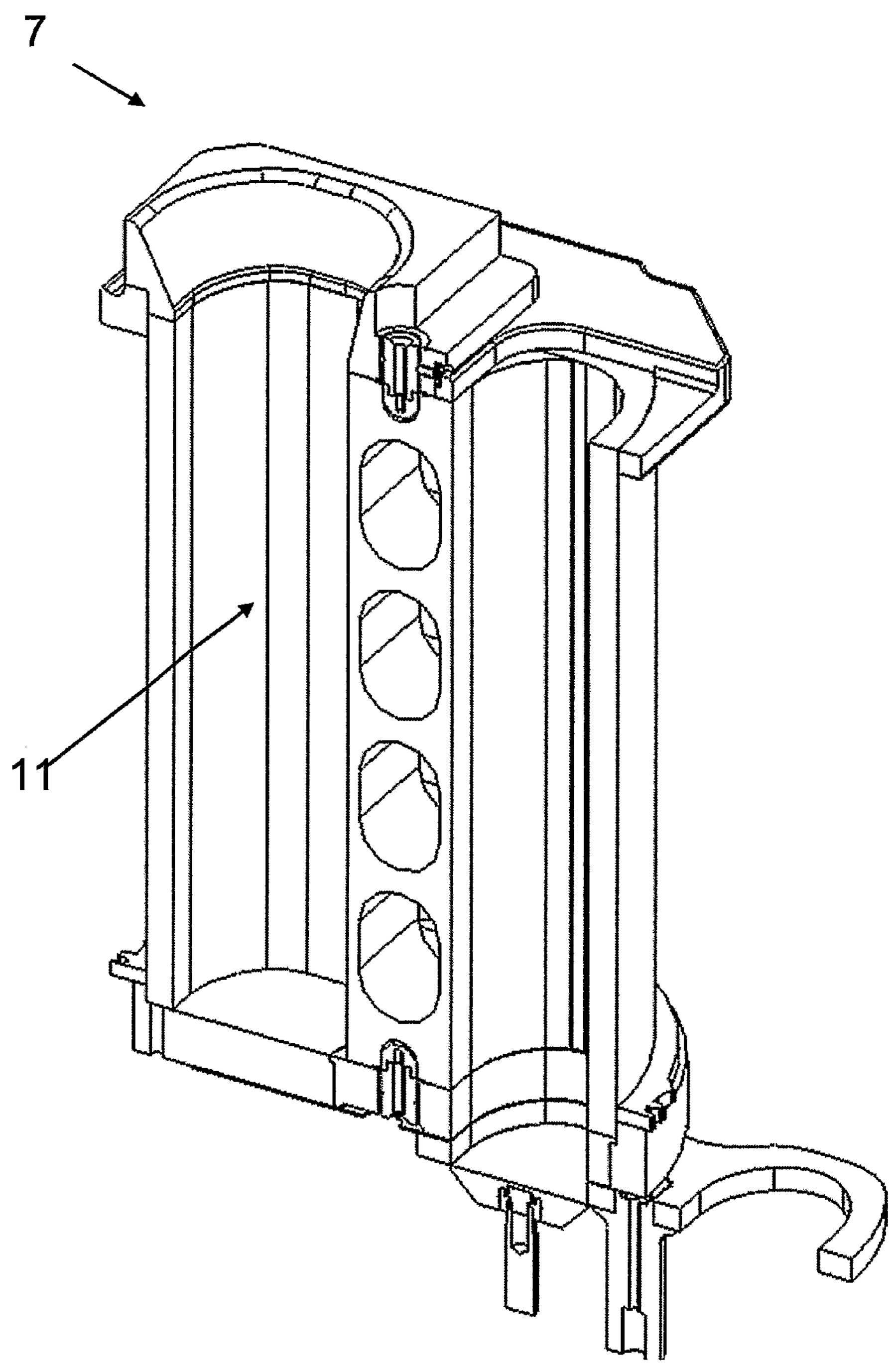
FIG. 10 is a perspective view of a mould for holding a primal cut of meat ready for portioning.
Figure 11:
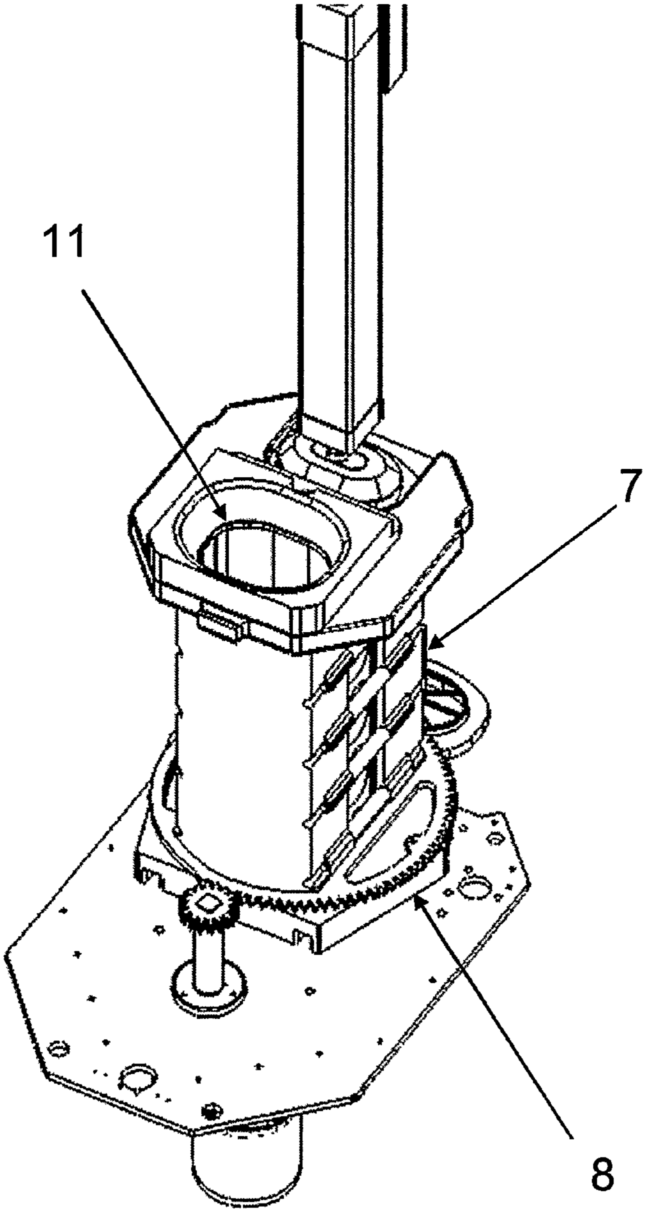
FIG. 11 shows the mould of FIG. 10 in a closed position.

FIGS. 10 and 11 show the mould 7 in to which the primal cut of meat is placed. In FIG. 10, one half of the mould 7 is, shown, and in both figures a chamber 11 is visible in which the meat is held as it is cut. The mould 7 is arranged to hold the meat tightly so that each chop assumes a consistent and appropriate shape, and so that each chop is of a consistent size and weight, thereby assisting packaging, and ensuring uniformity of the end product.

Figure 12:
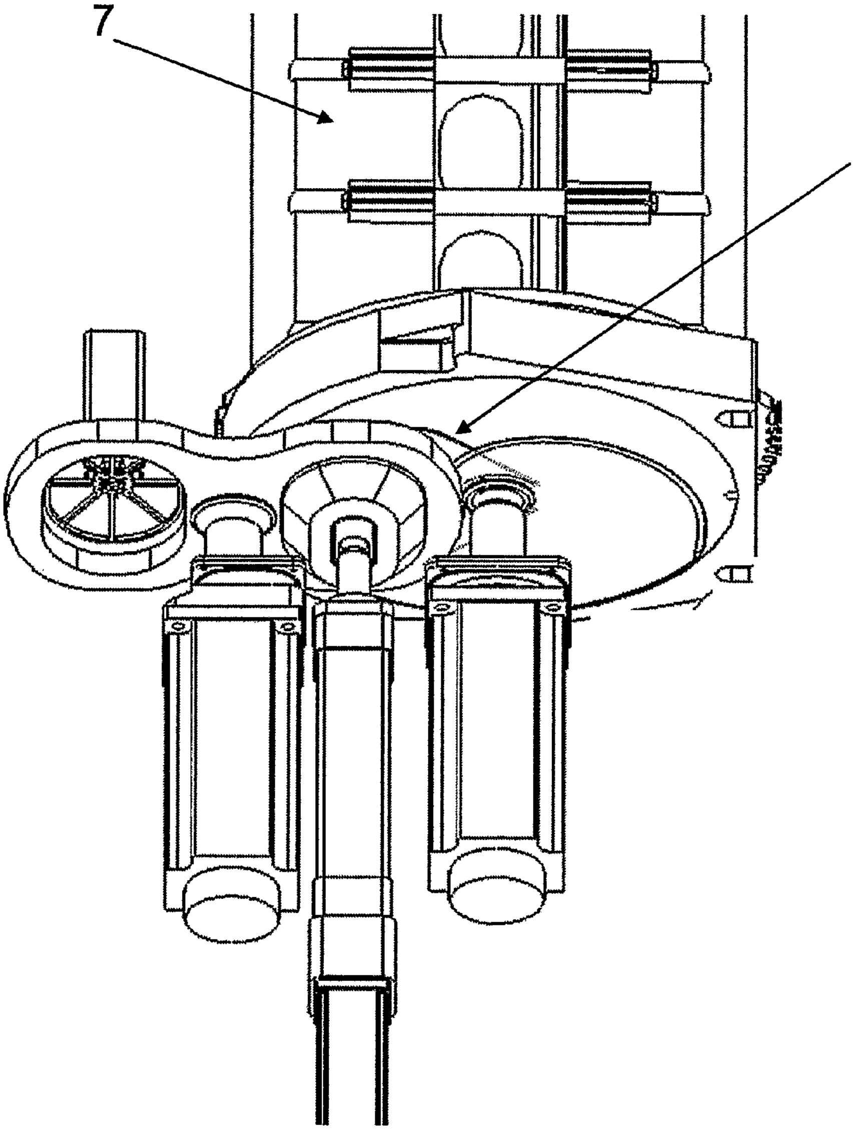
FIG. 12 is a perspective view of a portioning knife located at the bottom of the mould shown in FIGS. 10 and 11.

FIG. 12 shows some of the detail in the knife region 8, including a knife 12 which rotates in order to cut the meat within the chamber 11 into slices, and in this case into chops.

It will be appreciated that, at the end of a primal cut of meat which is to be sliced, the last chop is unlikely to be of the same thickness as the other chops because its thickness will depend on how much is left after the other chops have been cut. This makes the final chop unacceptable to be included in the pack 3 because it is not consistent with the other chops. Consequently, when the last chop is produced, this must not be included in any of the batches created by the portioning machine 4. The presence of the last chop or end piece of the primal cut of meat is recognised by the position of the piston. If the distance of the piston from the knife 12 is less than the thickness of the acceptable chops, then the end piece has been reached. Consequently, the portioning conveyor 10 will advance by a relatively large distance before the end piece of the primal cut of meat is put on the conveyor 10. However, the previous batch of chops might not have been completed. For example, the previous batch might only contain two pieces of meat, and therefore constitute a partial batch. This partial batch is passed forward by the portioning conveyor to a retractable conveyor 5 which is described below, and the portioning machine must ensure that the next chops which are created by the portioning machine must be a remainder batch in order to make the partial batch up to a full batch. The portioning machine 4 includes a portioning controller 13 which can be seen in FIG. 9, and this calculates how many chops need to be present in the remainder batch in order to make the partial batch into a full batch.

The portioning controller 13 is important since it controls the output of the portioning machine 4. Before the portioning machine 4 is used, it must be set with the number of pieces of meat which will make up a full batch, and might also be set to include other characteristics of the meat, such as their thickness and whether or not end pieces of the primal cut of meat may be included. The portioning controller 13 might include registers to hold settings concerning the number of pieces of meat in each batch and the thickness, and whether the end pieces may be included in the batches. Further, the portioning controller 13 electronically labels the slices of meat. The first slice and the last slice of a primal cut are given different electronic labels to the other slices of meat. By labels, these are identifying labels contained within the computer memory, and not labels which are applied directly to the meat. The portioning controller 13 can set up the machine such that slices with a label different to the normal or default one are either swept off the belt by an arm, or are run off the end of the conveyor. The portioning controller 13 must also be capable of counting the number of chops that are sliced from the primal cut so that, when a full batch is produced, the portioning conveyor 10 can be advanced ready for the commencement of the next batch, and also to count the number of slices of meat which are cut up until the presence of an end piece is determined. When a remainder batch is created, the portioning controller 13 ensures that the remaining number of pieces of meat are cut to make the remainder batch such that the remainder batch, when added to the partial batch makes a full batch.

When the next primal cut of meat is placed into the mould 7, the knife 12 begins to operate and to cut chops from the piece of meat again. If the leading edge of the primal cut of meat is not appropriate for creating chops for the pack 3, for example because it is unevenly cut or shaped, then this also will be kept separate from a remainder batch which is cut from the piece of meat immediately thereafter. Thus, the portioning conveyor 10 will hold a series of complete batches of chops from the first piece of meat, it might then have a partial batch from the first primal cut of meat followed by the end piece of the first primal cut of meat, perhaps the leading end chop from a second primal cut of meat followed by a remainder batch to make up the partial batch to a full batch.

Figure 13:
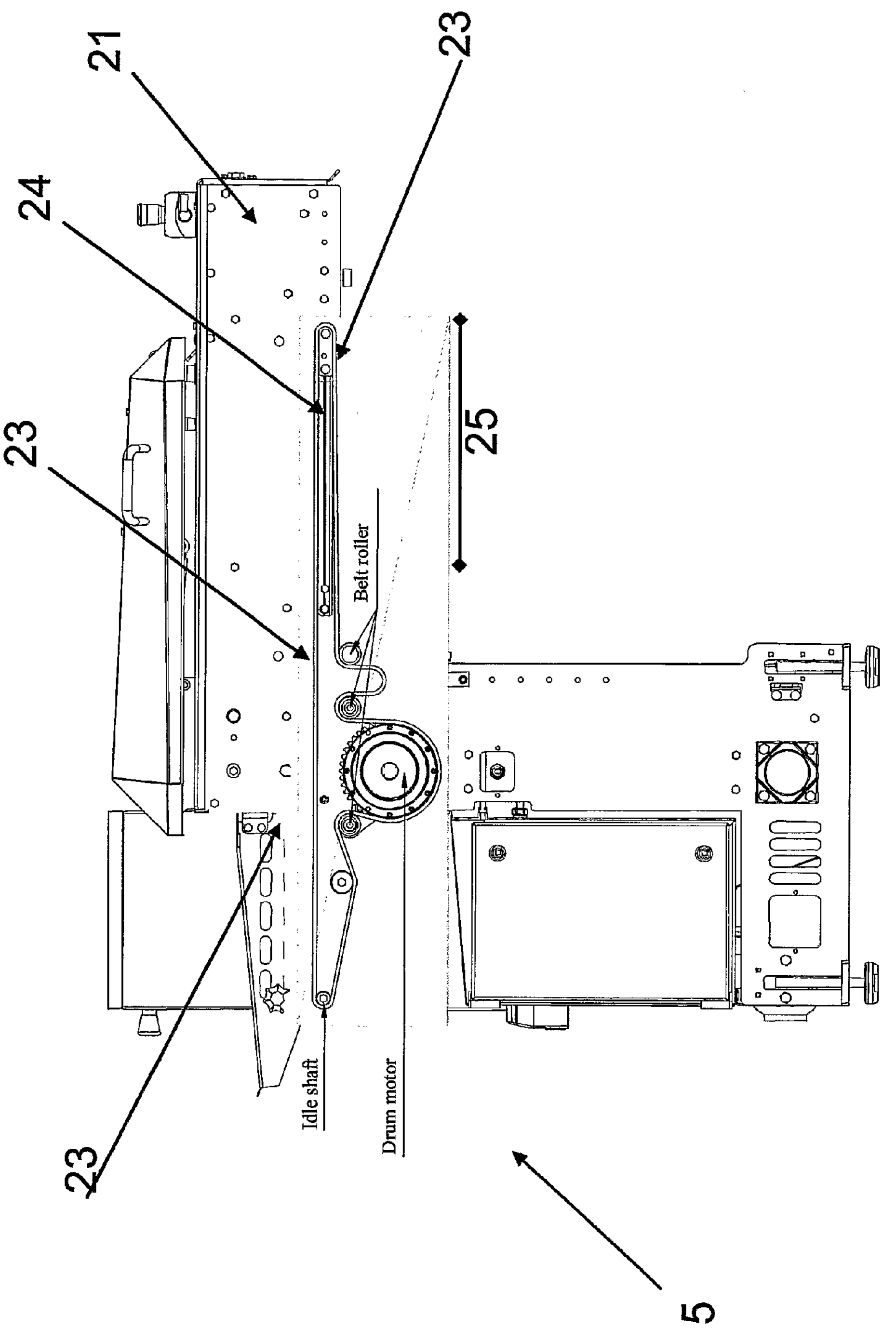
FIG. 13 shows a retractable conveyor.

FIG. 13 shows a retractable conveyor 5 in schematic form so that certain components can be seen, despite normally being positioned within safety housings and casings. The retractable conveyor 5 includes a belt 20 located within a conveyor body 21, which passes over a number of rollers and shafts. In FIG. 13, the belt 20 moves in a clockwise direction in order to transport objects from the left hand end to the right hand end. The belt 20 is driven by a motor (not shown), and the part of the path of the belt 20 that travels to the right and is the uppermost part of the belt forms the transport area 23. In FIG. 13, the conveyor is shown in its extended position so that the transport area 23 extends most of the way to the right hand end of the machine 5. The transport area 23 is supported so as to be able to withstand the weight of the food items which pass along it, in this case chops. Beneath the transport area towards the right hand end of the belt is a sliding support assembly 24 which can be retracted to the left in order to shorten the length of the transport area 23. When this happens, a large loop of belt 20 is drawn downwardly towards the ground in order to take up the slack and ensure that the belt 20 remains taut. The part of the belt 20 which retracts is indicated as the retraction region 25.

Figure 14:
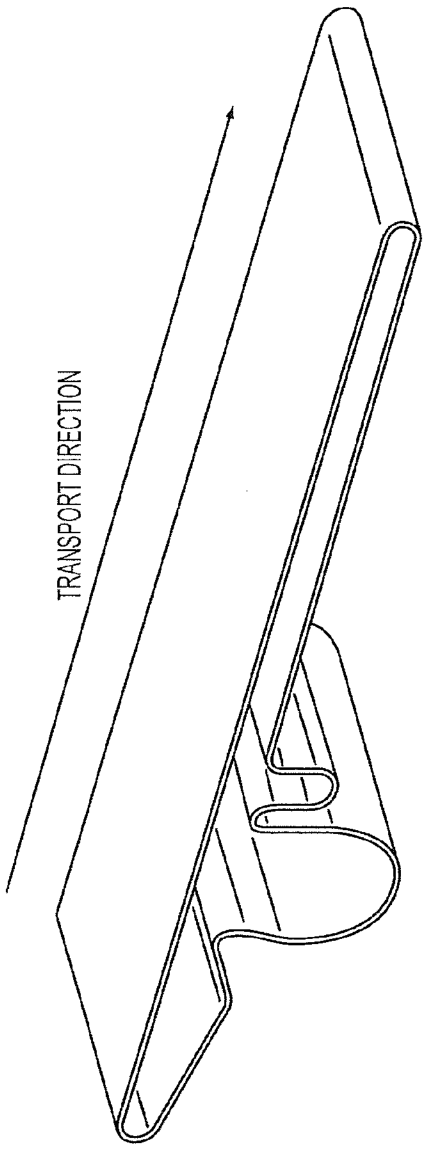
FIG. 14 is a schematic perspective view of the belt of the retractable conveyor of FIG. 13 with the belt extended.
Figure 15:
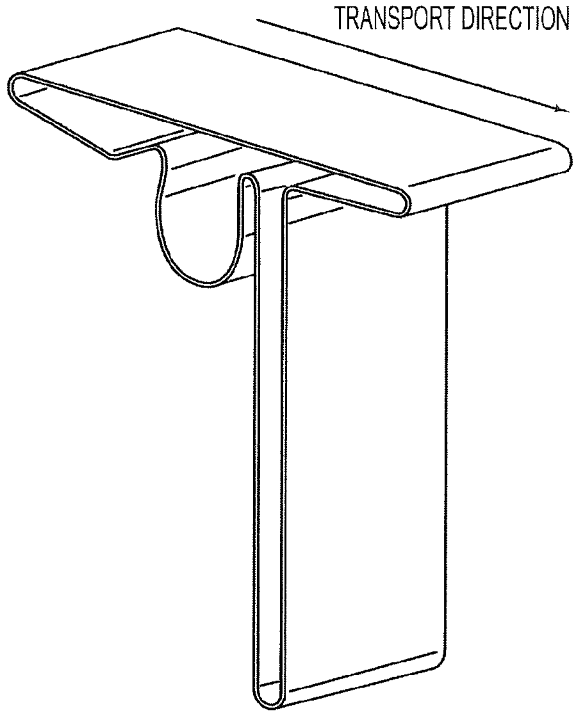
FIG. 15 is a schematic perspective view of the belt of FIG. 14 in a retracted position.

FIGS. 14 and 15 show the effect of the retraction very clearly. In FIG. 14, the belt 20 is in the extended position, and it will be seen that, on retraction, not only does the length of the transport area 23 reduce from the right hand end, but a long loop of belt is taken downwardly in order to take up the slack and ensure that the belt remains taut. The retractable conveyor 5 is still able to operate in the retracted position by advancing the belt 20.

When an item is positioned on the transport area 23 of the belt 20 in the retraction region 25, the belt will be retracted very quickly, and the item which was on the belt 20 will drop vertically. By locating a tray or another conveyor beneath the retraction region, the item can be moved from the retractable conveyor 5 to another location. By adjusting the longitudinal position of the item on the belt immediately before it is retracted, accurate control can be had of exactly where the item is placed. Referring again to FIGS. 5 and 6, it will be seen that the partial batch is accurately positioned within the tray towards one end so that there is room for the remainder batch to be dropped into the tray in exactly the right position offset from the partial batch so as to maintain an even overlap. This is achieved by controlling the position at which each batch is dropped.

The retractable conveyor 5 is arranged to take the chops from the portioning machine 4 and to place them in trays 2. The portioning conveyor 10 is positioned next to the belt 20 of the retractable conveyor 5 so that the chops will be fed to the belt 20 by the portioning conveyor. When a full batch reaches the retraction region 25 of the retractable conveyor 5, it is accurately positioned so that, when the belt 20 is retracted, it will drop into a tray 2 immediately beneath it. However, when a partial batch is supplied to the belt 20, the chops must be positioned in the tray 2 in a position such as is shown in FIG. 5 so as to leave room for the remainder batch. When it is a partial batch, it is important for the controller 13 to give the retractable conveyor 5 information concerning the number of chops within the partial batch or within the remainder batch so that the remainder batch can be positioned offset with respect to the partial batch together with the offset distance. It will be appreciated here (that is to say, where a full batch includes four chops) that the partial batch might not be two, but could be one or three. The remainder batch will include enough further chops in order to make up the full batch. The position of the remainder batch in the tray will depend on how many chops are included in the partial batch.

The retractable conveyor 5 includes a sensor 27 arranged to detect the presence of any items on the belt 20. The sensor 27 in this embodiment is an optical sensor in which a beam of light is directed transversely across the belt 20 towards a light detector. The sensor 27, which includes both the source of light and the light detector, are arranged just above the belt so that any item passing along it is detected. Thus, batches, partial batches, remainder batches and off-cuts which are generated by the portioning machine 4 and which are passed to the retractable conveyor 5 can readily be detected.

The retractable conveyor 5 includes a conveyor controller 26 which is not shown in FIG. 13, 14 or 15. More details of this controller are given in FIG. 16. Since the sensor 27 detects the leading edge of the batch, partial batch or remainder batch passing through the transport area 23, its position on the conveyor is known, and this allows the controller 26 to locate it in the retraction region in such a position that it is dropped in the correct position in a tray or on another conveyor beneath it. The controller 26 is capable of achieving accurate positioning, and when joining partial and remainder batches, is able to ensure that they are positioned together to form a full batch. It will be appreciated that the conveyor controller 26 must receive sufficient information from the portioning controller to allow it to position the partial or remainder batch correctly.

It will also be appreciated that, while the sensor 27 in this instance is an optical system, other sensors are also possible, and this application is not limited to the use of the sensor shown in this embodiment.

Figure 16:
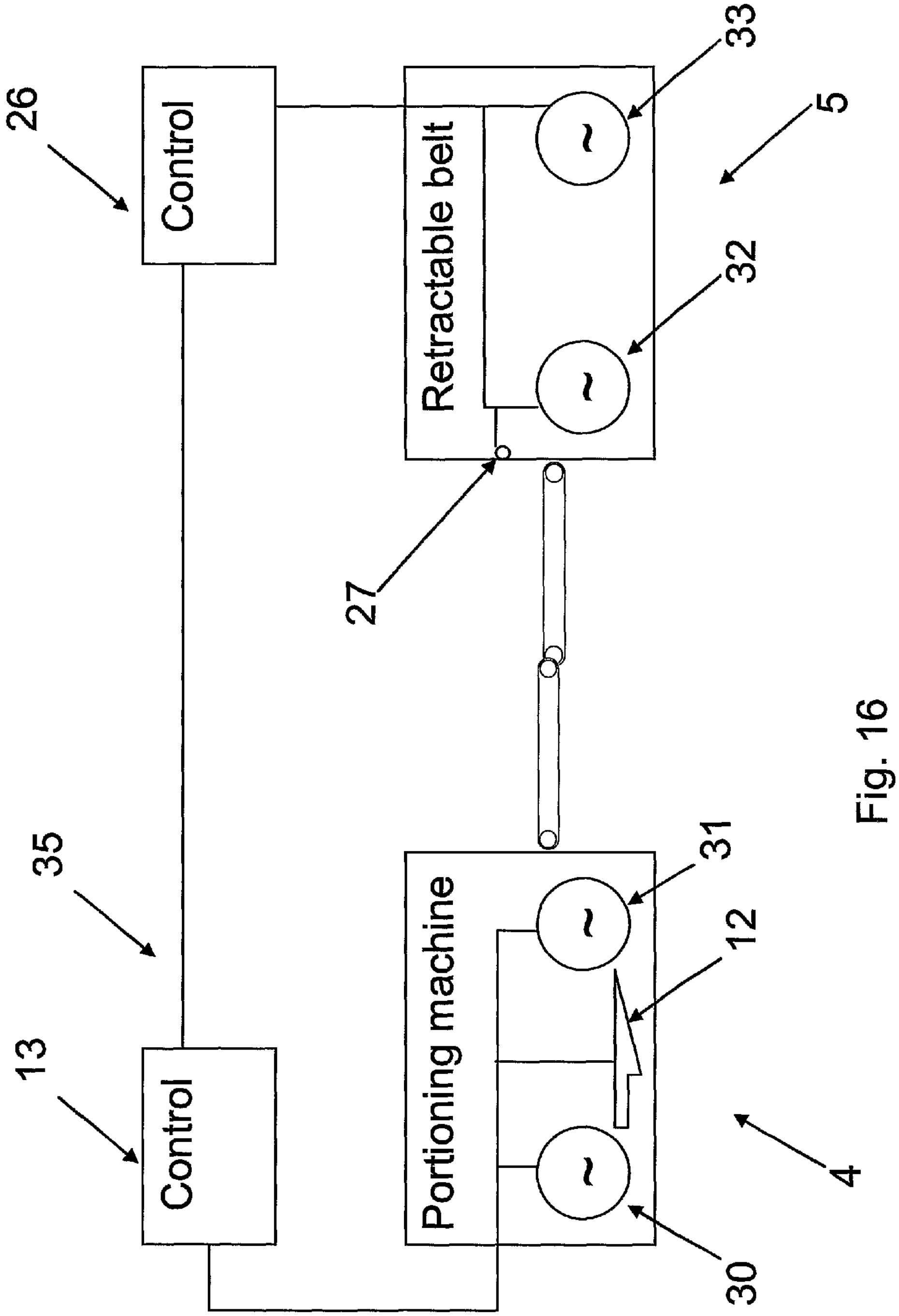
FIG. 16 is a schematic view showing the way in which the portioning machine and retractable conveyor are connected together.

FIG. 16 is a schematic drawing showing how the portioning machine 4 and retractable conveyor 5 are connected together. The portioning machine is shown to include the knife 12, a knife motor 30 for driving the knife, a belt motor 31 which drives the portioning conveyor 10, both of which are connected to the portioning controller 13. The retractable conveyor 5 is shown to include a belt motor 32 and a retraction motor 33 which drives the retraction of the belt 20. The motors 32 and 33 are controlled by the controller 26. Additionally, the retractable conveyor 5 includes the sensor 27 which detects the presence of items on the transport area 23 of the belt 20. This sensor 27 is used to allow the retractable conveyor 5 to control exactly where an item is located on the belt when it is retracted. This sensor 27 supplies sensing information to the controller 26. A communication link 35 is located between the portioning controller 13 and the conveyor controller 26 so that the portioning controller 13 is able to indicate to the retractable conveyor controller 26 the number of items in the partial batch, and/or the number of items in the remainder batch and the offset that is to be applied.

Figure 17:
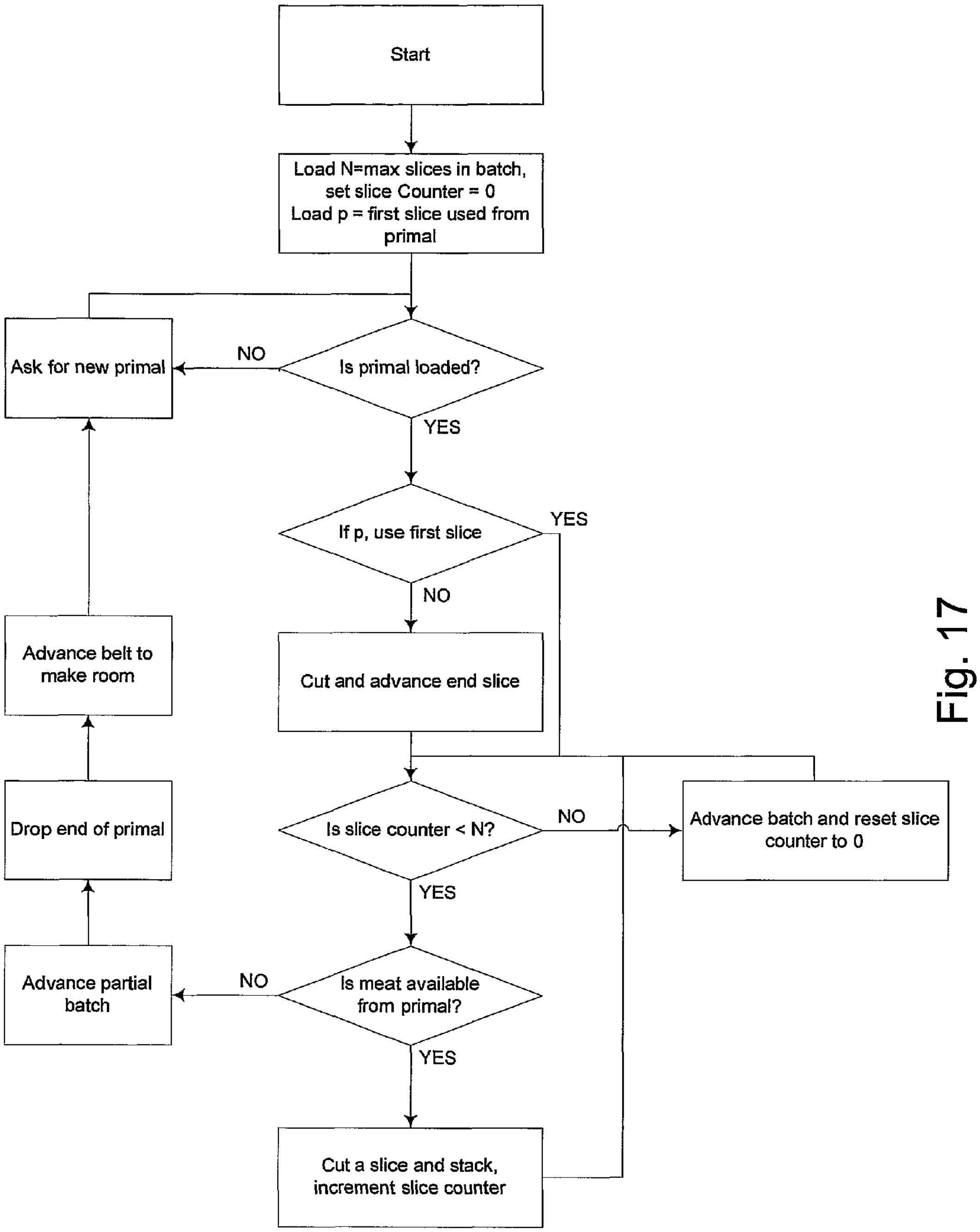
FIG. 17 is a flow diagram showing the operation of the present invention.
Figure 18:
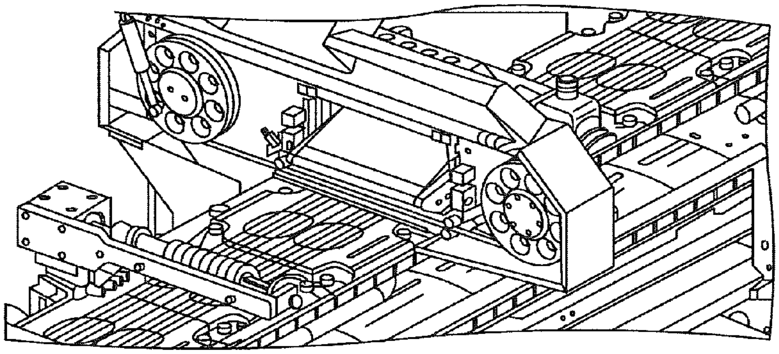
FIG. 18 is a perspective view of a machine for cutting chicken breast into chicken fingers
Figure 19:
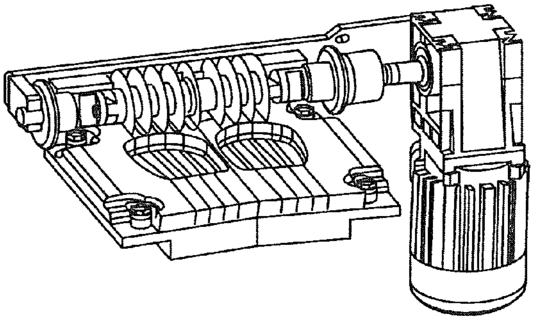
FIG. 19 is a perspective view of the longitudinal cutter
Figure 20:
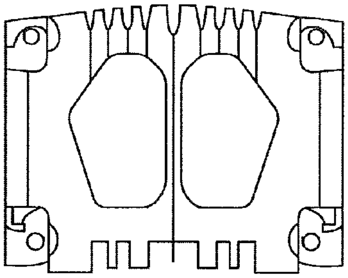
FIG. 20 is a view of the mould showing a one chicken breast with supplementary part and one were the supplementary part has been cut off.

FIG. 17 is a flow diagram showing how the process is carried out, controlled by the portioning controller 13 and the conveyor controller 26. In box 41, the slice count is set to zero, and the meat is loaded into the portioning machine. In box 42, an assessment is made as to whether or not the batch is already full. If it is not full, then the system proceeds to box 43. A question is then asked whether meat is available. If it is available then, in box 44, the meat is sliced to create a chop, and the slice counter is incremented. This is stacked with an overlap on any preceding slice of meat in that batch. If it is the first slice within the batch, then it will be positioned on its own on the portioning conveyor 10. This system then returns to box 42 and follows the same set of questions. If in box 42, the batch is full, because N chops have been cut, the system proceeds to box 45 in which the batch is advanced on the portioning conveyor 10, and the batch counter is reset to zero. N is the number of chops which make up a batch. The system then returns to box 42 to commence a new batch. If during the creation of a batch, the meat becomes unavailable, then this will be picked up in box 43, and the system will advance the partial batch in 46. The end of the primal will be dropped in step 47. In step 48 the belt is advanced to make room for the remaining partial batch. Finally in 49 a request is made for new primal to be loaded.

It will be appreciated from the embodiment described above that the arrangement of the chops will depend on what is required by the customer. In this case, each batch is made up of four chops in an overlapping arrangement within a tray. Other customers might require more or less chops within each tray, and some might prefer the chops to lie side by side in the tray without any overlap at all. Other customers might require each chop to lie on top of the previous one without any overlap at all. The present invention is not limited to delivering items in an overlapping manner, but simply one which is suitable for packaging. What is important is the ability of the system to make partial batches up to full batches. It is expected that this invention has particular application where a batch includes at least three items such that at least one of the partial or remainder batches includes more than one item.

Additionally, this invention is not restricted simply to pork chops, or even to meat products, but can be applied equally well to other items. This invention has particular application to foodstuffs. Other types of sliced meats can be processed besides chops, and meat from other animals can also be processed. Additionally, other types of foodstuffs such as fish can be processed in this way, and the foodstuff might even be frozen. It could even be applied to non-foodstuff applications.

In the embodiment described above, a portioning machine is described. In the case of meat production, this is highly advantageous, but in other embodiments, the portioning machine can be replaced by a suitable source of items to be packed. It does not need to cut individual items from a bulk item in the way described in the embodiment described above, although there are significant advantages in doing so for meats. Additionally, the retractable conveyor used in the preferred embodiment, whilst being highly advantageous in that embodiment is not, in itself, essential. Any machine which is able to combine a remainder batch and partial batch to make up a full batch would be suitable.

As the reader should appreciate by now, the present invention is applicable to many configurations, not limited by being coupled with a portioning machine. The portioning machine discussed above is simply a detailed example provided to properly explain and disclose the features of the present invention. The portioning machine discussed above should be considered to a one possible front-end of many which can be coupled to the present invention. The following short description of other possible embodiments demonstrates the flexibility of adapting the present invention to a variety of configuration and scenarios.

In one of the preferred embodiments, the front-end of the present invention is an in-feed/sorting apparatus receiving as an input hand carved T-Bone steaks from multiple cutters. The best meat is destined to a demanding high-paying customers were the meat quality is judged by plurality of characteristics. An apparatus might pre-select items together based on some criteria or characteristics, for example weight of individual pieces, thickness, or color, or perhaps a combination thereof. Lets take for example a scenario were the goal is to select together 6 12 oz T-bone steaks in a package, all having the same shade of red. The shade of red is slightly different from one carcass to another. Therefore, the batching process becomes a bit more complicated. In this scenario it may become necessary to make partial batches which can be completed at a later time, closaer to the packing area. Clearly the present invention solves the problem of packing the partial batches of this scenario.

In another preferred embodiment, the scenario is a bakery and the front-end of the present invention is conveyor with pastry or rolls with at least one substantially flat surface. The pastry may come in multiple side by side streams and be stacked by the present invention by dropping them into a suitable packages. Whether the pastry is delivered in a single stream or multiple side by side streams is not important. The fact remains, that when some kind of pre-sorting is performed and the portions are in some partially completed stage, the present invention applicable to solve the problem and pack complete batches by combining partial batches.

In another preferred embodiment, the scenario is in a chicken processing plant. 18 The front end is an apparatus which cuts chicken breasts into chicken strips and supplementary part. At one end the apparatus is loaded with whole chicken breasts and returns two products at the other end, the end attaching with the present invention. These products are, well formed chicken fingers 21 which are arranged in groups, and a supplementary product. These two products are interleaved such that every other product is a group of chicken fingers, and the other group is the supplementary product. The supplementary group can, in one embodiment, be removed from the apparatus by the means of a board which reaches across the conveyor and guides or sweeps the supplementary product of before it reaches the input of the present invention. In that way, portions can be easily built up. A problem arises when there is a gap in product delivery, for example if the worker is not quick enough to load the apparatus and the chicken breast is loaded into only one of the two moulds 20 in the loading unit. In those cases the present invention solves the problem quickly by combining partial batches.

In yet another preferred embodiment is the scenario, the scenario is a fish processing plant. The front end in this case fillet skinner and the object to arrange the fillets side by side in a partially overlapping fashion in some appropriate packages. The weights of the batches need to be within some agreed upon limits. In this case a consecutive five fillets may not fit within the weight limit agreed upon with the customer. But, the first three and sixth and seventh fillets fit perfectly. In this case the present invention starts a first batch with the first three fillets, and a second batch with fillets four and five. Next it completes the first batch by adding fillets six and seven to the batch. Depending on the characteristics of the next group of fillets the present invention might either start a third batch or complete the second batch.

Clearly, the present invention is useful in myriad of different applications. Wherever a batching process might benefit from batching by means of partial batching; whether it be to speed up the batching process, because of missing items, or any such situation were the expected flow of items is disturbed, the present invention is useful and solves the problem.

In many applications the present invention might be capable of identifying partial batches and full batches. This can be accomplished, for example, by machine vision and image processing system. Another system might use a dynamic scale to determine the size of the partial batches. Yet another system might measure the length of the partial batch on the conveyor and so on. In yet another situations the present invention might receive these information from the from end system, and thus not need to process any intelligence to identify different batch sizes.

The invention claimed is:

1. Apparatus arranged to combine a plurality of food items into a batch having a set number of items, comprising:

a production line;

a portioning machine including a knife arranged to cut a bulk piece of foodstuff into slices which constitute said food items, and which are placed together on the production line to form batches, a source controller for controlling the portioning machine and the production line, wherein the source controller is configured to:

operate the portioning machine to slice the bulk piece of foodstuff into said slices, whereby each slicing operation of the portioning machine produces one slice of the foodstuff;

determine whether or not a part or an item of the bulk piece of foodstuff is suitable for being included in a batch having a set number of batch items being produced and to identify any item unsuitable for being included in the batch being produced as a non-batch item, wherein identifying the non-batch items includes determining a remaining thickness of the bulk piece of foodstuff and identifying the remaining bulk piece as the non-batch item, if the remaining thickness is below an acceptable thickness for the food items to be included in said batches;

instruct the production line to advance the batch being produced as a partial batch without the non-batch item being added to it if a part of the bulk piece of foodstuff is identified as the non-batch item that is not suitable in the batch being produced;

instruct the portioning machine to supply the non-batch item onto the production line;

instruct the production line to remove the non-batch item from the apparatus;

determine the number of partial items in the partial batch and the number of remainder items in a remainder batch, the remainder batch including the number of items that must be added to the partial batch to make a full batch; and instruct the portioning machine to create the remainder batch; and a combiner arranged to add the remainder batch to the partial batch to make up a full batch, the apparatus being configured to arrange the items of the full batch such that each of the items of the full batch are being arranged in an at least partly overlapping fashion with respect to another one of the items of the full batch.

2. Apparatus according to claim 1, wherein the source controller is arranged to generate a partial batch signal for directing to the combiner which indicates at least one of: a) the number of items making up a partial batch, and b) the number of items making up a remainder batch.

3. Apparatus according to claim 1, wherein the source controller is arranged to allocate an electronic label to each item which is held within the source controller, the label for non-batch items being distinguishable from other labels.

4. Apparatus according to claim 1, wherein the portioning machine includes a mould arranged to retain the bulk piece of foodstuff as it is portioned.

5. Apparatus according to claim 1, wherein the portioning machine is arranged to cut a primal cut of meat into portions.

6. Apparatus according to claim 1, wherein the combiner includes a retractable conveyor.

7. Apparatus according to claim 1, wherein the combiner includes a conveyor controller arranged to control the conveyor to add the remainder batch to the partial batch to form a full batch.

8. Apparatus according to claim 7, wherein the source controller is arranged to generate a partial batch signal for directing to the combiner which indicates at least one of: a) the number of items making up a partial batch, and b) the number of items making up a remainder batch, and wherein the conveyor controller is connected to the source controller to receive the partial batch signal.

9. Apparatus according to claim 8, wherein the conveyor controller is further arranged to control the conveyor to add the remainder batch to the partial batch so that the two batches are aligned as if they were formed as a single batch.

10. Apparatus according to claim 7, wherein the conveyor controller is arranged to control the conveyor so as to run non-batch items off its end away from the partial batch.

11. Apparatus according to claim 1, wherein the combiner includes a sensor arranged to detect the position of an item on the conveyor.

12. Apparatus according to claim 1, further comprising an arm mounted for movement across the path of the items, operation of which serves to remove non-batch items from the apparatus.

13. A method of combining a plurality of food items into a batch having a set number of items, comprising:

providing an apparatus arranged to combine a plurality of food items into a batch having a set number of items, said apparatus comprising a portioning machine, a production line, and a combiner;

cutting, within the portioning machine, a bulk piece of foodstuff into slices which constitute said food items and placing the portions together onto the production line to form a batch;

determining whether or not a part or an item of the bulk piece of foodstuff is suitable for being included in a batch of items being produced within the portioning machine and identifying any item unsuitable for being included in the batch being produced as a non-batch item, wherein said step of determining whether or not said part or an item of the bulk piece of foodstuff is suitable for being included in the batch includes the step of determining a remaining thickness of the bulk piece of foodstuff and identifying the remaining bulk piece as the non-batch item, if the remaining thickness is below an acceptable thickness for the food items to be included in said batches;

supplying non-batch items which are not suitable for inclusion within the batch onto the production line;

advancing the batch on the production line as a partial batch without the non-batch item being added to it when a batch is not complete;

removing the non-batch items from the apparatus;

creating a remainder batch after the non-batch items have been added to the production line, wherein the remainder batch includes the number of items that must be added to the partial batch to make a full batch;

determining a number of partial items in the partial batch and the number of remainder items in the remainder batch; and arranging the items of the full batch such that each of the items of the full batch are being arranged in an at least partly overlapping fashion with respect to another one of the items of the full batch.

14. A method according to claim 13, further including counting the number of items in a batch, and if the batch is partial, calculating the number of items to be included in the remainder batch which, when added to the partial batch will make a full batch.

15. A method according to claim 13, further including generating a partial batch signal indicating at least one of: a) the number of items making up a partial batch, and b) the number of items making up a remainder batch.

16. A method according to claim 13, further including allocating within an electronic system, an electronic label to each item, the label for non-batch items being distinguishable from other labels.

17. A method according to claim 13, wherein the bulk piece of foodstuff is a primal cut of meat.

18. A method according to claim 13, wherein the step of adding the remainder batch to the partial batch is done by use of a retractable conveyor.

19. A method according to claim 13, further comprising:

including generating a partial batch signal indicating at least one of: a) the number of items making up a partial batch, and b) the number of items making up a remainder batch; and including receiving the partial batch signal.

20. A method according to claim 18, further comprising controlling the conveyor to add the remainder batch to the partial batch so that the two batches are aligned as if they were formed as a single batch.

21. A method according to claim 18, further comprising controlling the conveyor so as to run non-batch items off its end away from the partial batch.

22. A method according to claim 18, further comprising detecting the position of an item on the conveyor.

23. A method according to claim 13, wherein the set number of items making up a full batch is at least three.

24. Apparatus according to claim 1, wherein the portioning machine includes a mould arranged to retain poultry breasts as it is portioned.

25. Apparatus according to claim 1, wherein the portioning machine is arranged to cut poultry breasts into portions.

* * * * *